(12) United States Patent
Salem et al.

(10) Patent No.: US 10,333,393 B2
(45) Date of Patent: Jun. 25, 2019

(54) EMBEDDED CHARGE PUMP VOLTAGE REGULATOR

(71) Applicant: QUALCOMM Incorporated, San Diego, CA (US)

(72) Inventors: Loai Galal Bahgat Salem, San Diego, CA (US); Hua Guan, San Diego, CA (US); Ngai Yeung Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 15/274,525

(22) Filed: Sep. 23, 2016

(65) Prior Publication Data

US 2018/0091044 A1  Mar. 29, 2018

(51) Int. Cl.
| | | |
|---|---|---|
| *G05F 1/10* | (2006.01) | |
| *G05F 3/02* | (2006.01) | |
| *H02M 3/07* | (2006.01) | |
| *G05F 1/56* | (2006.01) | |

(52) U.S. Cl.
CPC ............... *H02M 3/07* (2013.01); *G05F 1/56* (2013.01)

(58) Field of Classification Search
CPC . G05F 3/262; G05F 3/265; G05F 3/30; G05F 3/205; G11C 5/147
USPC ........................................................ 327/536
See application file for complete search history.

(56) References Cited

U.S. PATENT DOCUMENTS

| | | | | |
|---|---|---|---|---|
| 6,049,201 A * | 4/2000 | Feldtkeller | ............... | H02M 3/07 323/284 |
| 6,411,531 B1* | 6/2002 | Nork | ..................... | H02M 3/073 363/60 |
| 6,566,846 B1* | 5/2003 | Voo | ......................... | H02M 3/07 307/81 |
| 7,301,318 B2* | 11/2007 | Haider | .................... | H02M 3/07 323/282 |
| 7,554,305 B2* | 6/2009 | Nunokawa | .............. | G05F 1/575 323/273 |
| 7,724,551 B2* | 5/2010 | Yanagida | .............. | H02M 3/073 323/266 |
| 8,242,833 B2* | 8/2012 | Lin | ......................... | H02M 3/07 327/535 |
| 8,248,150 B2 | 8/2012 | Tadeparthy et al. | | |
| 8,461,910 B2* | 6/2013 | Nadimpalli | ........... | H02M 3/073 327/536 |
| 9,225,234 B2 | 12/2015 | Ku et al. | | |
| 9,225,239 B2 | 12/2015 | Williams | | |

(Continued)

FOREIGN PATENT DOCUMENTS

EP         0952661 A2      10/1999

OTHER PUBLICATIONS

International Search Report and Written Opinion—PCT/US2017/049692—ISA/EPO—dated Dec. 12, 2017.

*Primary Examiner* — Anh Q Tra
(74) *Attorney, Agent, or Firm* — Patterson & Sheridan, L.L.P.

(57) ABSTRACT

Certain aspects of the present disclosure provide methods and apparatus for implementing a voltage regulator. The voltage regulator includes a power field effect transistor (FET) comprising a gate terminal. The voltage regulator further includes a charge pump, the charge pump comprising a capacitor switchably coupled to the gate terminal. The voltage regulator further includes a current outputting amplifier switchably coupled to the capacitor.

23 Claims, 6 Drawing Sheets

(56) References Cited

U.S. PATENT DOCUMENTS

| | | |
|---|---|---|
| 9,264,053 B2 | 2/2016 | Englekirk |
| 2005/0168905 A1* | 8/2005 | Kimura ................ G09G 3/3283 |
| | | 361/204 |
| 2008/0297235 A1 | 12/2008 | Hammerschmidt et al. |
| 2012/0019232 A1* | 1/2012 | Chen ....................... G05F 1/561 |
| | | 323/313 |
| 2015/0198959 A1 | 7/2015 | Kuttner |
| 2016/0282890 A1* | 9/2016 | Malinowski ............ G05F 1/575 |

* cited by examiner

EMBEDDED CHARGE PUMP VOLTAGE REGULATOR

TECHNICAL FIELD

Certain aspects of the present disclosure generally relate to electronic circuits and, more particularly, to embedded charge pump voltage regulators.

BACKGROUND

Power management integrated circuits (power management ICs or PMIC) are used for managing the power requirement of a host system. A PMIC may be used in battery-operated devices, such as mobile phones, tablets, laptops, wearables, etc., to control the flow and direction of electrical power in the devices. The PMIC may perform a variety of functions for the device such as DC to DC conversion, battery charging, power-source selection, voltage scaling, power sequencing, etc. For example, a PMIC may be used for voltage regulation and may feature a low-dropout regulator (LDO).

SUMMARY

Certain aspects of the present disclosure provide a voltage regulator. The voltage regulator includes a power field effect transistor (FET) comprising a gate terminal. The voltage regulator further includes a charge pump, the charge pump comprising a capacitor switchably coupled to the gate terminal. The voltage regulator further includes a current outputting amplifier switchably coupled to the capacitor.

Certain aspects of the present disclosure provide a method for operating a voltage regulator. The method includes coupling, in a first mode of operation, a capacitor to a gate terminal of a power field effect transistor (FET). The method further includes coupling, in the first mode of operation, the capacitor to a current outputting amplifier. The method further includes decoupling, in the second mode of operation, the capacitor from the current outputting amplifier. The method further includes decoupling, in the second mode of operation, the capacitor from the gate terminal of the power FET.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

The techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), Single Carrier Frequency Division Multiple Access (SC-FDMA), Time Division Synchronous Code Division Multiple Access (TD-SCDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement Institute of Electrical and Electronics Engineers (IEEE) 802.11, IEEE 802.16, Long Term Evolution (LTE) (e.g., in TDD and/or FDD modes), or some other standards. A TDMA system may implement Global System for Mobile Communications (GSM) or some other standards. These various standards are known in the art.

AN EXAMPLE WIRELESS SYSTEM

Figure 1:
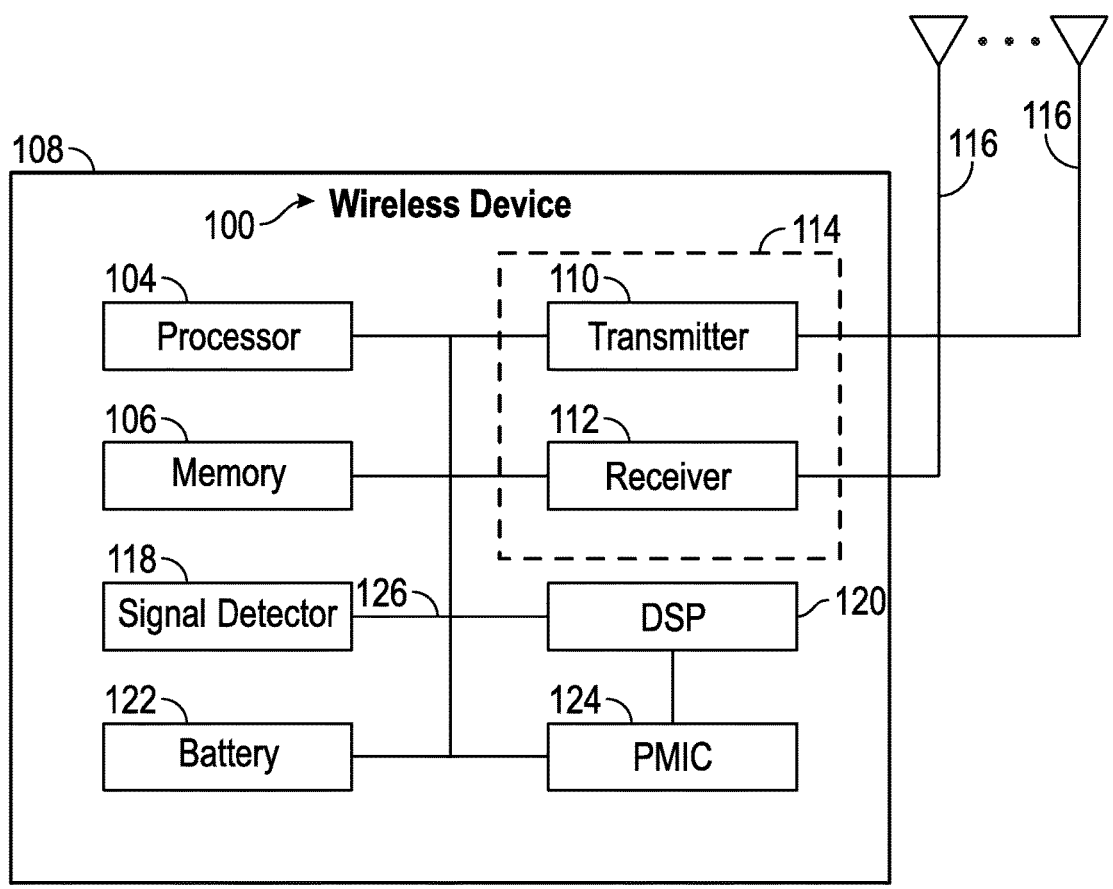
FIG. 1 illustrates a block diagram of an example device including a voltage regulator, according to certain aspects of the present disclosure.

FIG. 1 illustrates a device 100. The device 100 may be a battery-operated device such as a cellular phone, a personal digital assistant (PDA), a handheld device, a wireless modem, a laptop computer, a tablet, a personal computer, etc. The device 100 is an example of a device that may be configured to implement the various systems and methods described herein.

The device 100 may include a processor 104 which controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106. The instructions in the memory 106 may be executable to implement the methods described herein.

The device 100 may also include a housing 108 that may include a transmitter 110 and a receiver 112 to allow transmission and reception of data between the device 100 and a remote location. The transmitter 110 and receiver 112 may be combined into a transceiver 114. A plurality of transmit antennas 116 may be attached to the housing 108 and electrically coupled to the transceiver 114. The device 100 may also include (not shown) multiple transmitters, multiple receivers, and multiple transceivers.

The device 100 may also include a signal detector 118 that may be used in an effort to detect and quantify the level of signals received by the transceiver 114. The signal detector 118 may detect such signals as total energy, energy per subcarrier per symbol, power spectral density and other signals. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC to DC conversion, battery charging, power-source selection, voltage scaling, power sequencing, etc. In certain aspects, the PMIC 124 includes a voltage regulator (e.g., low-dropout regulator (LDO)) as described herein, and may be used for voltage regulation.

The various components of the device 100 may be coupled together by a bus system 126, which may include a power bus, a control signal bus, and a status signal bus in addition to a data bus.

AN EXAMPLE VOLTAGE REGULATOR

Certain aspects of this present disclosure generally relate to voltage regulators with an embedded charge pump. Embedding the charge pump in the voltage regulator design, as described herein, may provide several advantages, including significantly reducing the die area used to implement the voltage regulator. In certain aspects, such voltage regulators with an embedded charge pump may be used in a fully digital voltage regulator architecture.

In certain aspects, voltage regulators, such as a LDO, include a power field-effect transistor (FET) and a differential amplifier. A power FET may be a type of FET (e.g., metal oxide semiconductor FET) designed to handle large power levels. For example, a power FET may have high switching speed and efficiency at low voltages. Different types of power FETs may have different characteristics. For example, a p-channel metal-oxide-semiconductor (PMOS) FET and a n-channel metal-oxide-semiconductor (NMOS) FET (both of which are power FETs) may have different characteristics. In some implementations, such as for implementations to be used for higher voltage outputs, a p-channel metal-oxide-semiconductor (PMOS) FET may be used over an n-channel metal-oxide-semiconductor (NMOS) FET. For example, the PMOS FET may use a lower gate drive voltage than an NMOS FET. However, the PMOS FET may have a lower carrier mobility than an NMOS FET, and therefore a larger area may be dedicated for the PMOS FET.

Accordingly, in certain aspects, it may be beneficial to utilize a NMOS FET instead of a PMOS FET in a voltage regulator to reduce the size of the voltage regulator. However, as discussed above, an NMOS FET may use a higher gate drive voltage than a PMOS FET. In certain aspects, in order to utilize a NMOS FET, a standalone charge pump may be used to provide a higher supply voltage for the gate drive. It should be noted that though the voltage regulator with an embedded charge pump is described below with respect to a NMOS FET, it is not so limited and may be designed using a different type of power FET in certain aspects.

Figure 2:
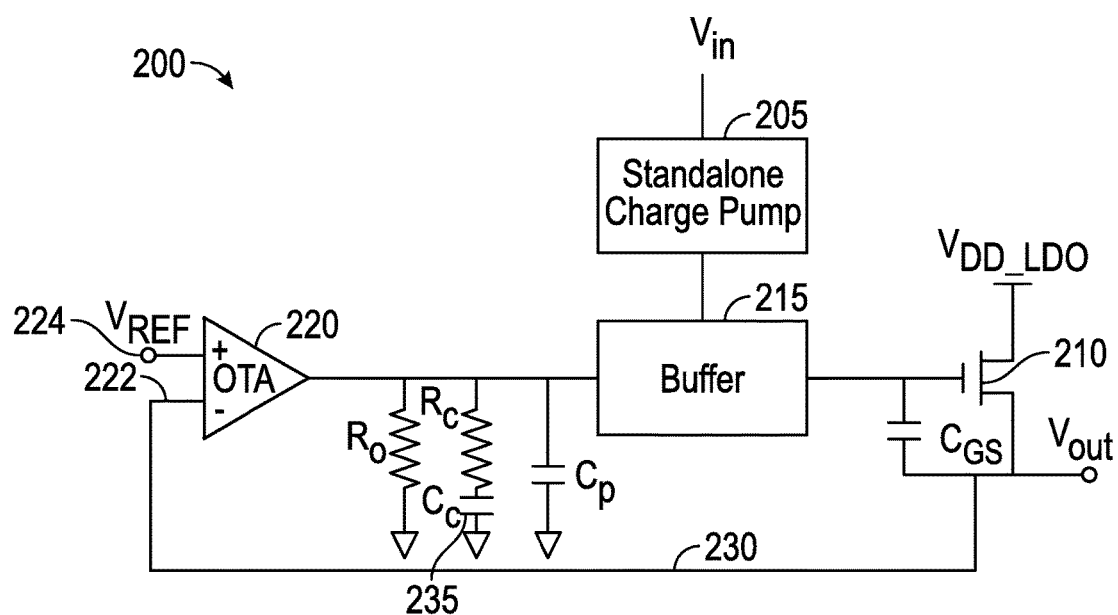
FIG. 2 illustrates a block diagram of an example voltage regulator with a standalone charge pump, according to certain aspects of the present disclosure.

For example, as shown with respect to FIG. 2, a voltage regulator 200 may include a standalone charge pump 205 (e.g., multi-phase closed loop variable frequency charge pump, multi-phase bang-bang charge pump, etc.). The standalone charge pump 205 is coupled to the buffer 215 and can be used to provide a higher supply voltage (e.g., 2× the supply voltage (shown as "$V_{in}$") from a supply voltage source) to the NMOS FET 210 via the buffer 215. The buffer 215 is coupled to the gate of the NMOS FET 210 and drives the voltage at the gate using the voltage supplied by the standalone charge pump 205.

An operational transconductance amplifier (OTA) 220 controls the supply of voltage by the buffer 215 to the gate of the NMOS FET 210. The OTA 220 may have a differential input, including an inverting input 222 and a non-inverting input 224. The non-inverting input 224 may be coupled to a source providing a reference voltage ($V_{REF}$), and the inverting input 222 may be coupled to a feedback path 230 carrying an output voltage ($V_{OUT}$) of the voltage regulator 200, available at the source of the NMOS FET 210. Accordingly, the output current of the OTA 220 may be based on the error between $V_{OUT}$ and $V_{REF}$, and used to modulate the output of voltage by the buffer 215 to the NMOS FET 210.

As shown, the voltage regulator 200 also includes a compensation capacitor ($C_C$) 235. The $C_C$ 235 may be used for frequency compensation to avoid creation of unintentional positive feedback, which may cause oscillation and instability, and to control overshoot and ringing.

Figure 2A:
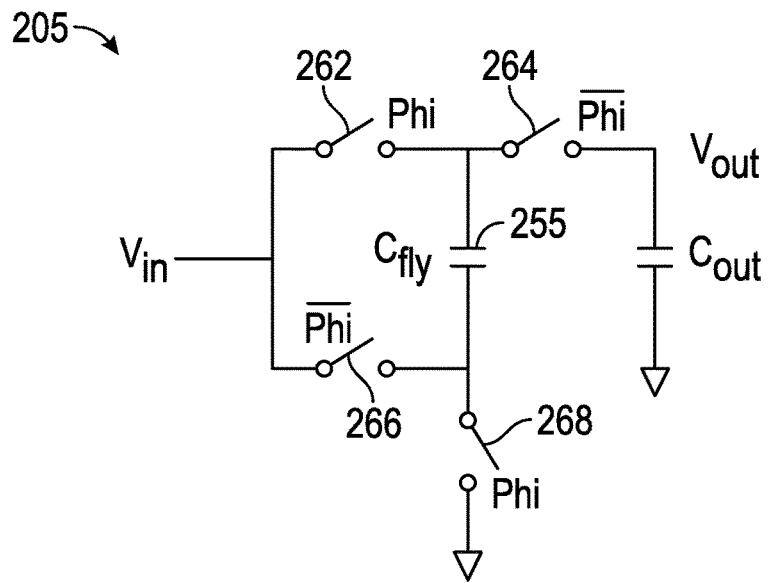
FIG. 2A illustrates a schematic diagram of an example standalone charge pump, according to certain aspects of the present disclosure.

FIG. 2A illustrates an example circuit diagram of an example standalone charge pump 205. As shown, the standalone charge pump 205 includes a flying capacitor ($C_F$) 255 that is used as the charge pump charge storage and therefore acts as a level shifter (e.g., a "bootstrap" capacitor) to shift the supply voltage (shown as "$V_{in}$") to the desired higher output voltage. The switches 262, 264, 266, and 268 may be operated to control the connection of voltages to the $C_F$ 255 (e.g., to the supply voltage or to the load) to obtain the desired output voltage.

In certain aspects, an NMOS FET 210 in the voltage regulator 200 may use a large gate drive current (e.g., up to 2 mA per NMOS FET) due to dynamic biasing. Therefore, a larger size $C_F$ 255 may be used for the large current. The larger $C_F$ 255 may therefore increase the die area for implementing the voltage regulator 200, as opposed to using a PMOS FET. Further, the voltage regulator may also use the $C_C$ 230. The $C_C$ 230 may use additional die area for implementation. In addition, use of a NMOS FET instead of a PMOS FET together with the use of the standalone charge pump 205, may increase the quiescent current in the voltage regulator 200. Further, the charge pump 205 may create ripple noise that may impact the output of the voltage regulator 200, even at a static load.

Accordingly, certain aspects described herein relate to voltage regulators with an embedded charge pump. In certain aspects, such voltage regulators may be able to utilize a NMOS FET, but still use less die area to implement than the voltage regulator 200. Further, in certain aspects, such voltage regulators may achieve a low quiescent current during static load. In addition, in certain aspects, the embedded charge pump may function as an integrator and a proportional-integral (PI) controller to achieve high DC gain for the voltage regulator. In certain aspects, such voltage regulators may also have a built-in retention mode described further herein, wherein a gate-to-source voltage ($V_{GS}$) for the FET is held no lower than a threshold voltage for the FET.

Figure 3:
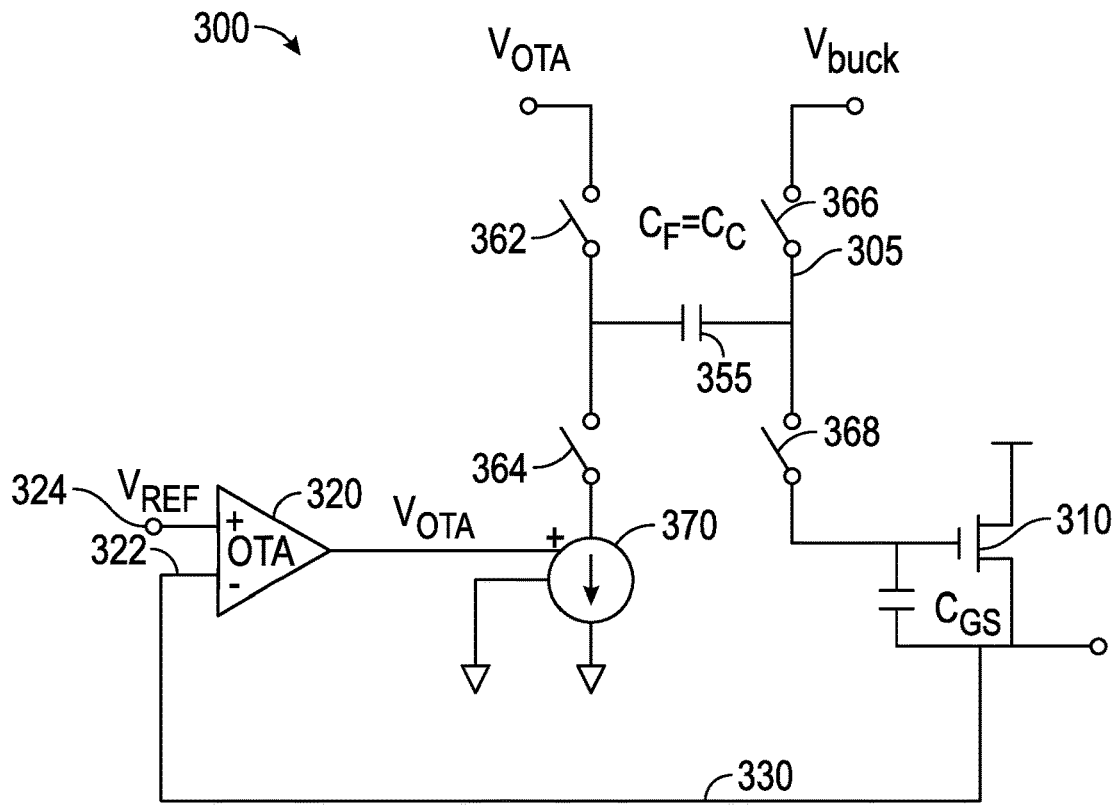
FIG. 3 illustrates a block diagram of an example voltage regulator with an embedded charge pump, according to certain aspects of the present disclosure.

FIG. 3 illustrates an example circuit diagram of a voltage regulator 300 with an embedded charge pump 305. As shown, the voltage regulator 300 includes the charge pump 305, a NMOS FET 310, and an OTA 320. The embedded charge pump 305 includes a capacitor 355. The gate-to-source capacitance ($C_{GS}$) of the NMOS FET 310 is shown as a capacitor $C_{GS}$ coupled between the gate of the NMOS FET 310 and the source of the NMOS FET 310.

The OTA 320 may have a differential input, including an inverting input 322 and a non-inverting input 324. The non-inverting input 324 may be coupled to a voltage source providing a reference voltage ($V_{REF}$), and the inverting input 322 may be coupled to a feedback path 330 carrying an output voltage ($V_{OUT}$) of the voltage regulator 300, which may be available at the source of the NMOS FET 310. Accordingly, the output current of the OTA 320 may be based on the error between $V_{OUT}$ and $V_{REF}$. Further, the output voltage ($V_{OTA}$) of the OTA 320 may be based on the output current of the OTA 320 and the load on the output of the OTA 320. It is important to note, that in some aspects, use of a transconductance amplifier or some other amplifier where the output of the amplifier is current is beneficial to the operation of the voltage regulator as described herein, as opposed to use of a standard operational amplifier or some other amplifier where the output is voltage.

The OTA 320 may be switchably coupled (e.g., directly) to the capacitor 355. Further the capacitor 355 may be switchably coupled (e.g., directly) to the gate of the NMOS FET 310. For example, as shown, the voltage regulator 300 includes first switch 362 and second switch 364 coupled in series. Further, the voltage regulator 300 includes third switch 366 and fourth switch 368 coupled in series. The capacitor 355 is coupled (e.g., directly) to a first connection between the first switch 362 and the second switch 364. The capacitor 355 is further coupled (e.g., directly) to a second connection between the third switch 366 and the fourth switch 368.

As shown, the first switch 362 is further coupled (e.g., directly) to an output of the OTA 320 and configured to switchably couple OTA 320 to the capacitor 355 to control whether the voltage output $V_{OTA}$ of the OTA 320 is applied to the capacitor 355.

Further, the second switch 364 is further coupled to a current source 370. The current source 370 is controlled by the current output of the OTA 320. Accordingly, the second switch 364 controls a current applied to the capacitor 355 to charge the capacitor 355, such as in a charging mode of the charge pump 305.

In addition, the third switch 366 is further coupled (e.g., directly) to a voltage supply (e.g., buck voltage supply) and configured to switchably couple (e.g., directly) the voltage supply to the capacitor 355 to control whether a voltage (e.g., at a particular level, such as, 2.0 V) is applied to the capacitor 355.

Finally, the fourth switch 368 is further coupled to the gate of the NMOS FET 310 and configured to switchably couple (e.g., directly) the capacitor 355 to the gate of the NMOS FET 310 to control whether a voltage is applied from the charge pump 305 to the gate of the NMOS FET 310. As shown, in certain aspects, the capacitor 355 is not directly coupled to the source of the NMOS FET 310, and therefore does not receive the signal $V_{OUT}$.

The first switch 362 and fourth switch 368 may be a first set of switches that are operably controlled together, meaning the first switch 362 and fourth switch 368 may be controlled to open and close together or at least substantially concurrently. Further, the second switch 364 and the third switch 366 may be a second set of switches that are operably controlled together or at least substantially concurrently, meaning the second switch 364 and third switch 366 may be controlled to open and close together or at least substantially concurrently. The first set of switches and the second set of switches may be controlled in an opposite fashion. For example, in a first mode of operation when the first set of switches is closed, the second set of switches is open, and in a second mode of operation when the second set of switches is closed, the first set of switches is open.

The first mode of operation, where the first switch 362 and the fourth switch 368 are closed may be referred to as a retention mode. In the retention mode, the OTA 320 is coupled to the capacitor 355, and the capacitor 355 is coupled to the gate of the NMOS FET 310. Accordingly, charge is applied to the gate terminal of the NMOS FET 310 so the NMOS FET 310 outputs the signal $V_{OUT}$, based on an input voltage Vdd (e.g., 1.85 V) generated by a voltage source, and as modulated by $V_{OTA}$ from the OTA 320. As discussed above, $V_{OTA}$ is based on the error of $V_{OUT}$ from $V_{REF}$, so the output voltage $V_{OUT}$ at the source of the NMOS FET 310 is modulated with hysteresis based on the error to be within a particular range of the desired output voltage $V_{OUT}$. In particular, since the output voltage of the voltage regulator 300 (e.g., the source voltage of the NMOS FET 310) is used as a feedback to the OTA 320, and $V_{OTA}$ is used as the supply voltage to the capacitor, $V_{OTA}$ acts as a proportional term (e.g., indicative of the present value of the error between the output voltage of the LDO and the reference voltage ($V_{REF}$)).

In particular, in the retention mode, capacitor 355 holds the gate-to-source voltage ($V_{GS}$) for the NMOS FET 310 no lower than the threshold voltage for the NMOS FET 310. The OTA 320 then modulates small changes of $V_{OUT}$ within a hysteresis band (within a threshold above and a threshold below) the desired $V_{OUT}$. During this retention mode, the proportional term as discussed above is enabled, and an integral term for control of the NMOS FET 310 is disabled.

The second mode of operation, where the second switch 364 and the third switch 366 are closed, may be referred to as a charging mode. In the charging mode, the voltage supply is coupled to the capacitor 355 and a voltage is applied to the capacitor 355. Further, in the charging mode, the current source 370 is coupled to the capacitor 355 and controls a current used to charge the capacitor 355. The current source 370, and therefore the current applied to the capacitor 355, is controlled by the current output of the OTA 320. The current output of the OTA 320 is based on the error of $V_{OUT}$ from $V_{REF}$, and is used to account for past values of the error in $V_{OUT}$. Thus, in the charging mode, the current charging the capacitor 355 acts as an integral term for control of the NMOS FET 310. Accordingly, in the charging mode, the proportional term is disabled, and the integral term for control of the NMOS FET 310 is enabled.

In certain aspects, a clock (external or internal) may perform control of the switching between the first mode of operation and the second mode of operation (e.g., duty cycle of the switches). In certain aspects, the duty cycle of the switches 362-368 of the charge pump 305 may be fixed, and directly switch based on the frequency of the clock (e.g., 19.2 MHz).

In certain aspects, the duty cycle of the switches 362-368 may be further controlled based on the output of a comparator. For example, the duty cycle may be controlled based on a comparison of $V_{OUT}$ to $V_{REF}$. In particular, if $V_{OUT}$ is less than $V_{REF}$ the duty cycle of the switches 362-368 may be based on the frequency of the clock (e.g., 19.2 MHz). However, if $V_{OUT}$ is greater than $V_{REF}$, the clock may be gated, and the charge pump 305 may be operated in the retention mode (e.g., first switch 362 and fourth switch 368 closed). In the retention mode, the switches 362-368 of the charge pump 305 are not switching, and the charge pump is not pumping, so during this mode quiescent current is reduced.

Figure 3A:
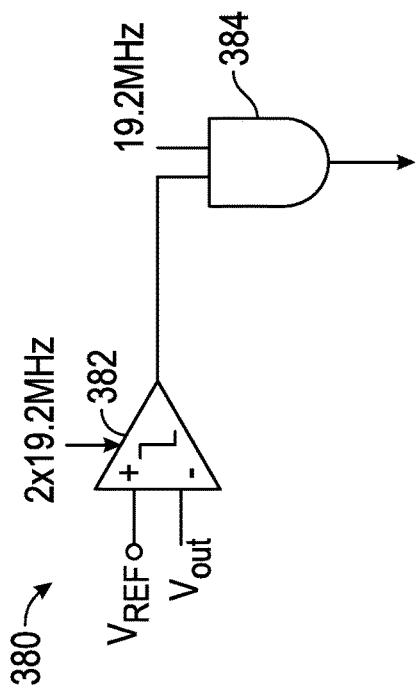
FIG. 3A illustrates a block diagram of an example control circuit for controlling the duty cycle of an embedded charge pump, according to certain aspects of the present disclosure.

FIG. 3A illustrates an example control circuit 380 for controlling the duty cycle of the switches 362-368 of the charge pump 305. As shown, the control circuit 380 includes a comparator 382. A first input of the comparator 382 is coupled to a line carrying the signal $V_{REF}$. A second input of the comparator 382 is coupled to a line carrying the signal $V_{OUT}$. An output of the comparator 382 is coupled to a first input of an AND gate 384. A second input of the AND gate 384 is coupled to a clock and receives a signal from the clock. When $V_{OUT}$ is greater than $V_{REF}$ the comparator 382 may output a low signal. Therefore the output of the AND gate 384, regardless of the clock signal, remains low, and the clock is gated. The charge pump 305 may therefore operate in the retention mode when the signal from the AND gate 384 is low. When $V_{OUT}$ is less than $V_{REF}$ the comparator 382 may output a high signal, and therefore the output of the AND gate 384 is based on the clock signal. The charge pump 305 may therefore switch between the retention mode and the charging mode based on the clock signal.

The capacitor 355 based on the layout and operation of the voltage regulator 300, is configured to act as both a flying capacitor $C_F$ and a compensation capacitor $C_C$. Therefore, instead of a separate $C_F$ and $C_C$, a single capacitor 355 can be used in the voltage regulator 300 to act as both a flying capacitor $C_F$ and a compensation capacitor $C_C$, thereby saving on die area to implement the voltage regulator 300. Further, as compared to the voltage regulator 200, the buffer 215 is not used, thereby additionally saving on die space.

In addition, based on the layout and operation of the voltage regulator 300, the charge pump 305 acts as an integrator stacked on top of the output of the OTA 320 to form a proportional term as described above. Thus, the charge pump 305 can further serve as a PI controller (and not require separate circuits for proportional and integral control portions) to achieve a high DC gain (e.g., by replacing the supply to the capacitor 355 in the charge pump 305 when coupled to the NMOS FET 310 with supply directly from the OTA 320, instead of a separate voltage supply). This PI controller further inserts a zero into the corresponding transfer function without any added dedicated compensation capacitance other than the capacitor 355. Further, as described herein, the added zero does not have to track the output pole of the NMOS FET 310 output, so current sensing is not required.

Figure 4:
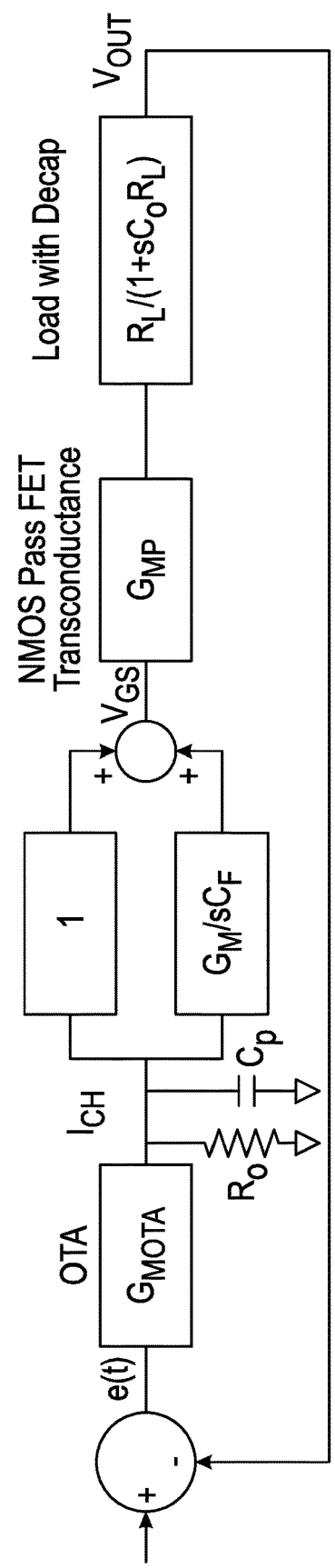
FIG. 4 illustrates a model of an example voltage regulator with an embedded charge pump, according to certain aspects of the present disclosure.

In particular, the operation of the voltage regulator 300, at the frequency of interest (near DC), may be modeled (assuming $f_{SW}$ (switching frequency)>>loop bandwidth) according to the first order model of voltage regulator 300 shown in FIG. 4 and the following equation:

$$G(s) = \frac{AG_M G_{MP} R_L \left[1 + \frac{sC_F}{G_M}\right]}{sC_F(1 + sC_0 R_L)}$$

Where $A = G_{MOTA} R_0$;
$P_0 = sC_F$;
$P_2 = (1 + sC_0 R_L)$;
$G_{MOTA}$ = the transconductance of the OTA 320;
$G_{MP}$ = the transconductance of the NMOS FET 310;
$R_L / [1 + sC_0 R_L]$ = the load with decap.

Figure 5:
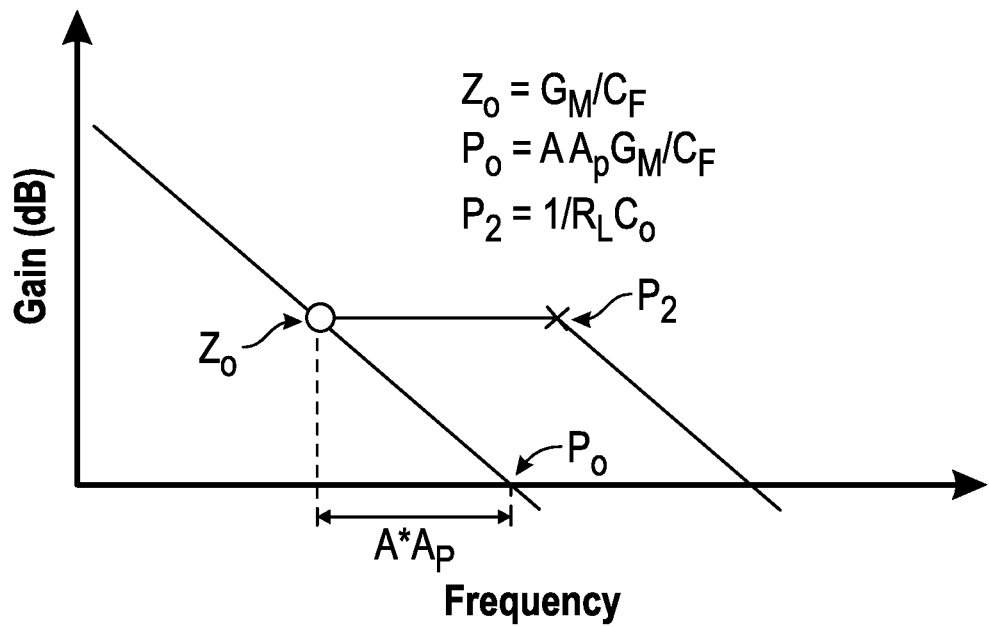
FIG. 5 illustrates a graph of the performance of an example voltage regulator with an embedded charge pump, according to certain aspects of the present disclosure.

Based on the first order model of voltage regulator 300, the gain (G(s)) of the voltage regulator 300 can be graphed against the switching frequency of the voltage regulator 300 as shown in FIG. 5. As shown $Z_0 = G_M / C_F$; $P_0 = AA_P G_M / C_F$; and $P_2 = 1/R_L C_0$. Therefore, the pole-zero ($P_0$ and $Z_0$) separation is approximately $A^* A_P$, and $A_P$ is approximately 1. By modulating $G_M$ (the transconductance of the integrator component of the charge pump 305), $Z_0$ can track the output pole $P_2$. Accordingly, this increases the stability of the voltage regulator 300 with respect to avoiding oscillation.

Moreover, based on the layout and operation of the voltage regulator 300, the charge pump 305 does not incur a quiescent current during static state operation and only consumes current during transient operation. Therefore, the size of the capacitor 355 can be reduced, and a lower switching frequency can be used to control the duty cycle between the first mode of operation and the second mode of operation. The charge pump 305 also does not insert noise on the source of the NMOS FET 310 at the steady state. Further, the charge pump 305 reaches partial retention state automatically at a steady state, so it is easier to move into a full retention mode.

Figure 6:
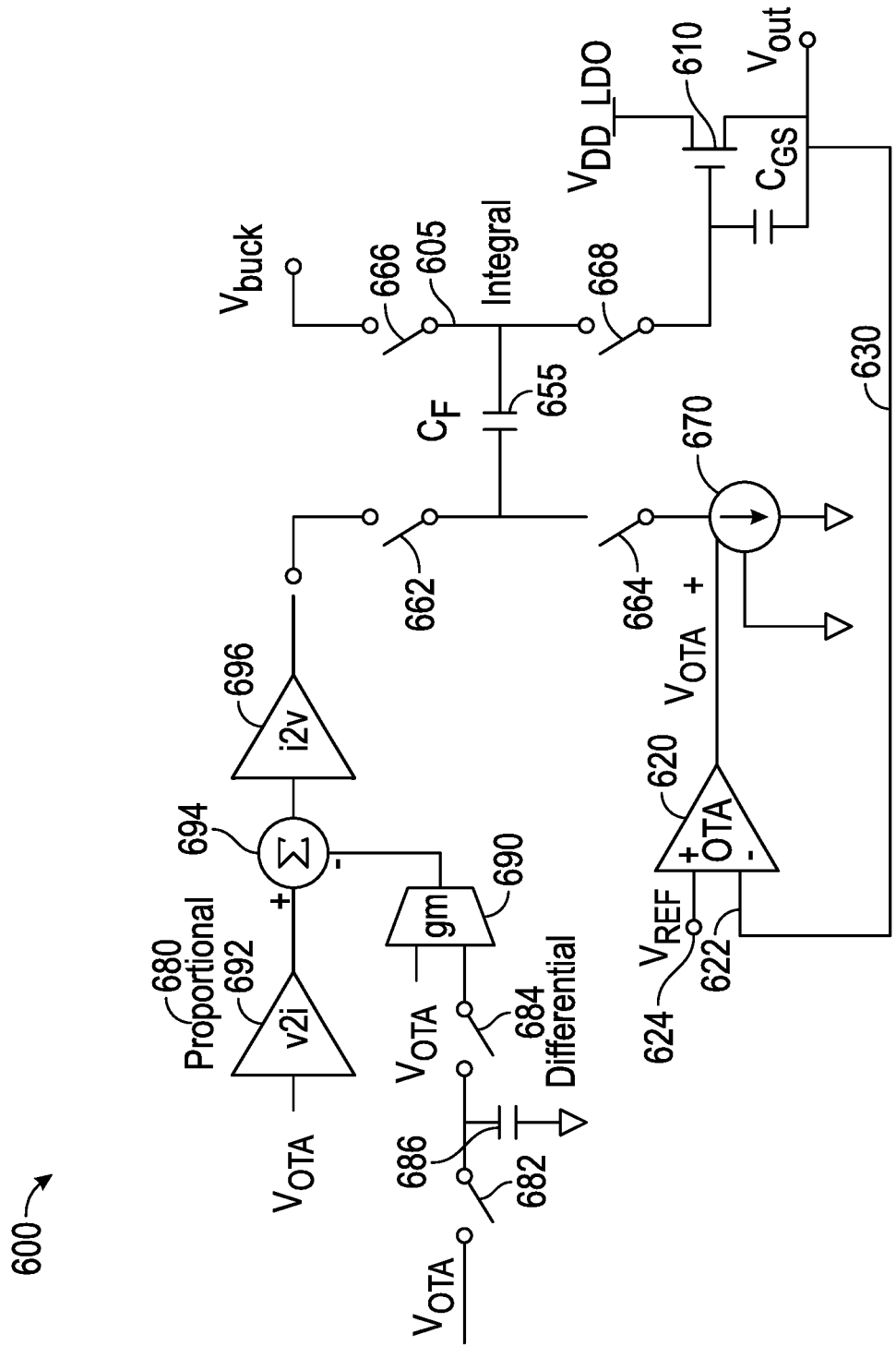
FIG. 6 illustrates a block diagram of another example voltage regulator with an embedded charge pump, according to certain aspects of the present disclosure.

In certain aspects, the concepts herein can be extended so the embedded charge pump acts not just as a PI controller, but further as a proportional-integral-derivative (PID) controller. For example, FIG. 6 illustrates an example circuit diagram of a voltage regulator 600 with an embedded charge pump 605 configured to act as a PID controller.

In particular, the voltage regulator 600 is similar to the voltage regulator 300, and shown with like numerals. As shown, the voltage regulator 600 includes the charge pump 605, a NMOS FET 610, and an OTA 620. The embedded charge pump 605 includes a capacitor 655. The gate-to-source capacitance ($C_{GS}$) of the NMOS FET 610 is shown as a capacitor $C_{GS}$ coupled between the gate of the NMOS FET 610 and the source of the NMOS FET 610.

The OTA 620 may have a differential input, including an inverting input 622 and a non-inverting input 624. The non-inverting input 624 may be coupled to a voltage source providing a reference voltage ($V_{REF}$), and the inverting input 622 may be coupled to a feedback path 630 carrying an output voltage ($V_{OUT}$) of the voltage regulator 600, available at the source of the NMOS FET 610. Accordingly, the output current of the OTA 620 may be based on the error between $V_{OUT}$ and $V_{REF}$. Further, the output voltage ($V_{OTA}$) of the OTA 620 may be based on the output current of the OTA 620 and the load on the output of the OTA 620.

The OTA 620 may be switchably coupled (e.g., indirectly) to the capacitor 655. Further the capacitor 655 may be switchably coupled to the gate of the NMOS FET 610. For example, as shown, the voltage regulator 600 includes first switch 662 and second switch 664 coupled in series. Further, the voltage regulator 600 includes third switch 666 and fourth switch 668 coupled in series. The capacitor 655 is coupled to a first connection between the first switch 662 and the second switch 664. The capacitor 655 is further coupled to a second connection between the third switch 666 and the fourth switch 668.

As shown, the first switch 662 is further coupled to a circuit 680 for providing proportional and differential terms of a PID controller based on an output of the OTA 620 and therefore configured to indirectly switchably couple OTA 620 to the capacitor 655 to control whether a signal based on $V_{OTA}$ of the OTA 620 is applied to the capacitor 655.

In particular, the circuit 680 includes a fifth switch 682 and a sixth switch 684 coupled in series. Further, a capacitor 686 is coupled to a node between the fifth switch 682 and the sixth switch 684 and further coupled to ground. The fifth switch 682 is further coupled to the OTA 620, and the sixth switch 684 is further coupled to a first input of a $G_M$ block (e.g., operational transconductor) 690. The second input of the $G_M$ block 690 is coupled to an output of the OTA 620.

The circuit 680 further includes a voltage-to-current converter 692, the input of which is coupled to an output of the OTA 620. The output of the voltage-to-current converter 692 is further coupled to an input of a summer 694. Another input of the summer 694 is further coupled to the output of the $G_M$ block 690. The summer 694 is configured to sum the signal from the voltage-to-current converter 692 and the inverse of the signal from the $G_M$ block 690. The output of the summer 694 is coupled to an input of a current-to-voltage converter 696, the output of which is coupled to the first switch 662.

Further, the second switch 664 is further coupled to a current source 670. The current source 670 is controlled by the current output of the OTA 620. Accordingly, the second switch 664 controls a current applied to the capacitor 655 to charge the capacitor 655, such as in a charging mode of the charge pump 605

In addition, the third switch 666 is further coupled to a voltage supply (e.g., buck voltage supply) and configured to switchably couple the voltage supply to the capacitor 655 to control whether a voltage (e.g., at a particular level, such as, 2.0 V) is applied to the capacitor 655.

Finally, the fourth switch 668 is further coupled to the gate of the NMOS FET 610 and configured to switchably couple the capacitor 655 to the gate of the NMOS FET 610 to control whether a voltage is applied from the charge pump 605 to the gate of the NMOS FET 610. As shown, in certain aspects, the capacitor 655 is not directly coupled to the source of the NMOS FET 610, and therefore does not receive the signal $V_{OUT}$.

The first switch 662, fourth switch 668, and sixth switch 684 may be a first set of switches that are operably controlled together, meaning the first switch 662, fourth switch 668, and sixth switch 684, may be controlled to open and close together or at least substantially concurrently. Further, the second switch 664, the third switch 666, and fifth switch 682 may be a second set of switches that are operably controlled together or at least substantially concurrently, meaning the second switch 664, third switch 666, and fifth switch 682 may be controlled to open and close together or at least substantially concurrently. The first set of switches and the second set of switches may be controlled in an opposite fashion. For example, in a first mode of operation when the first set of switches is closed, the second set of switches is open, and in a second mode of operation when the second set of switches is closed, the first set of switches is open.

The first mode of operation, where the first switch 662, the fourth switch 668, and the sixth switch 684 are closed may be referred to as a retention mode. In the retention mode, the OTA 620 is indirectly coupled to the capacitor 655, and the capacitor 655 is coupled to the gate of the NMOS FET 610. Accordingly, charge is applied to the gate terminal of the NMOS FET 610 so the NMOS FET 610 outputs the signal $V_{OUT}$, based on an input voltage Vdd (e.g., 1.85 V) generated by a voltage source, and as modulated by $V_{OTA}$ from the OTA 620. As discussed above, $V_{OTA}$ is based on the error of $V_{OUT}$ from $V_{REF}$, so the output voltage $V_{OUT}$ at the source of the NMOS FET 610 is modulated with hysteresis based on the error to be within a particular range of the desired output voltage $V_{OUT}$. In particular, since the output voltage of the voltage regulator 600 (e.g., the source voltage of the NMOS FET 610) is used as a feedback to the OTA 620, and $V_{OTA}$ is used as the supply voltage to the capacitor, $V_{OTA}$ acts as a proportional term (e.g., indicative of the present value of the error between the output voltage of the LDO and the reference voltage ($V_{REF}$)).

In particular, in the retention mode, capacitor 655 holds the gate-to-source voltage ($V_{GS}$) for the NMOS FET 610 no lower than the threshold voltage for the NMOS FET 610. The OTA 620 then modulates small changes of $V_{OUT}$ within a hysteresis band (within a threshold above and a threshold below) the desired $V_{OUT}$. During this retention mode, the proportional term as discussed above is enabled, and an integral term for control of the NMOS FET 610 is disabled.

The second mode of operation, where the second switch 664, the third switch 666, and the fifth switch 682 are closed may be referred to as a charging mode. In the charging mode, the voltage supply is coupled to the capacitor 655 and a voltage is applied to the capacitor 655. Further, in the charging mode, the current source 670 is coupled to the capacitor 655 and controls a current used to charge the capacitor 655. The current source 670, and therefore the current applied to the capacitor 655, is controlled by the current output of the OTA 620. The current output of the OTA 620 is based on the error of $V_{OUT}$ from $V_{REF}$, and is used to account for past values of the error in $V_{OUT}$. Thus, in the charging mode, the current charging the capacitor 655 acts as an integral term for control of the NMOS FET 610. Accordingly, in the charging mode, the proportional term is disabled, and the integral term for control of the NMOS FET 610 is enabled.

In certain aspects, a clock (external or internal) may perform control of the switching between the first mode of operation and the second mode of operation (e.g., duty cycle of the switches). In certain aspects, the duty cycle of the switches 662-668, 682, and 684 of the charge pump 605 may be fixed, and directly switch based on the frequency of the clock (e.g., 19.2 MHz).

In certain aspects, the duty cycle of the switches 662-668, 682, and 684 may be further controlled based on the output of a comparator. For example, the duty cycle may be controlled based on a comparison of $V_{OUT}$ to $V_{REF}$. In particular, if $V_{OUT}$ is less than $V_{REF}$ the duty cycle of the switches 662-668, 682, and 684 may be based on the frequency of the clock (e.g., 19.2 MHz). However, if $V_{OUT}$ is greater than $V_{REF}$, the clock may be gated, and the charge pump 605 may be operated in the retention mode (e.g., first switch 662 and fourth switch 668 closed). In the retention mode, the switches 662-668, 682, and 684 of the charge pump 605 are not switching. and the charge pump is not pumping, so during this mode quiescent current is reduced. A control circuit, such as the control circuit 380, may be used for controlling the duty cycle of the switches 662-668, 682, and 684 of the charge pump 605.

Figure 7:
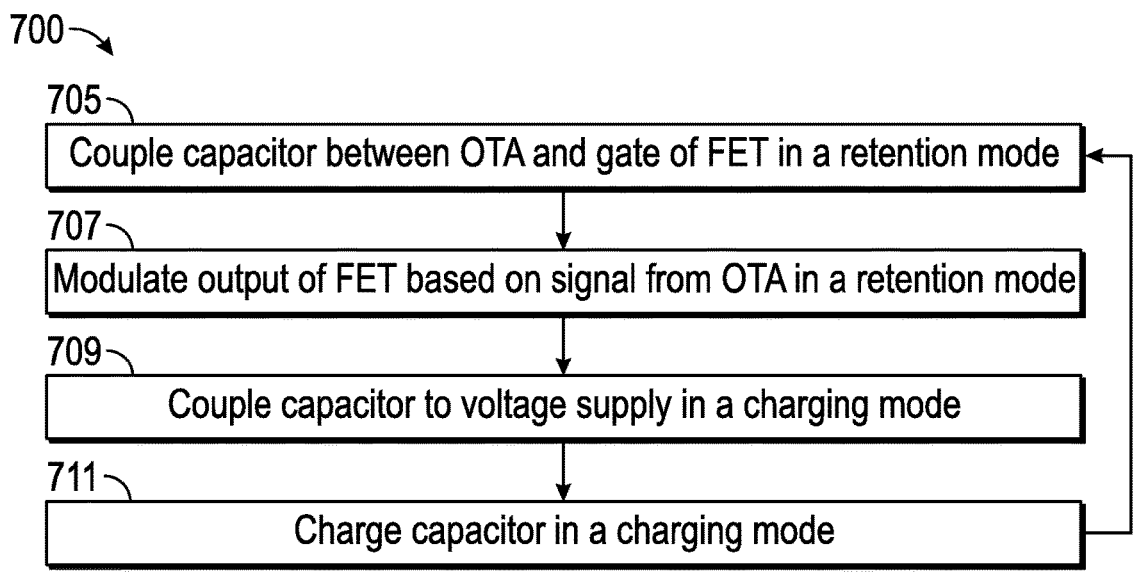
FIG. 7 illustrates example operations of a voltage regulator with an embedded charge pump, according to certain aspects of the present disclosure.

FIG. 7 illustrates example operations 700 for a voltage regulator with an embedded charge pump, in accordance with certain aspects of the present disclosure.

At 705, the capacitor in the embedded charge pump is coupled, based on a control signal, between an operational transconductance amplifier and a gate of a power FET, and the capacitor is decoupled from a power supply. Accordingly, the voltage regulator may enter a retention mode.

At 707, in the retention mode, a signal based on the output of the transconductance amplifier (e.g., based on $V_{OTA}$) is used to modulate the output ($V_{OUT}$) of the power FET within a range of a desired output voltage.

At 709, the capacitor in the embedded charge pump is coupled, based on a control signal, between a voltage supply and a current source, and the capacitor is decoupled from the operational transconductance amplifier and the gate of the power FET. Accordingly, the voltage regulator may be operating in a charging mode.

At 711, in the charging mode, the capacitor is charged by the voltage supply and the current source. The operations then continue back to 705.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A voltage regulator, comprising:
a power field effect transistor (FET) comprising a gate terminal;
a charge pump, the charge pump comprising a capacitor switchably coupled to the gate terminal; and
a current outputting amplifier coupled to a current source switchably coupled to the capacitor, wherein the capacitor is switchably coupled to a voltage source separately from the current outputting amplifier, wherein the current outputting amplifier is separate from the voltage source, wherein the capacitor is switchably coupled to an operational transconductor via a current-to-voltage converter and a summer separately from the current outputting amplifier and the voltage source, wherein the operational transconductor is separate from the current outputting amplifier and the voltage source, and wherein an input of the operational transconductor is coupled to an output of the current outputting amplifier.

2. The voltage regulator of claim 1, further comprising:
a first switch and a second switch connected in series; and
a third switch and a fourth switch connected in series,
wherein the capacitor is coupled between a first connection between the first switch and the second switch and a second connection between the third switch and the fourth switch, wherein the first switch is coupled to an output of the current outputting amplifier and the fourth switch is coupled to the gate terminal.

3. The voltage regulator of claim 2, wherein in a first mode of operation the first and fourth switches are closed and the second and third switches are open, wherein in a second mode of operation the first and fourth switches are open and the second and third switches are closed, and wherein an output of the power FET is coupled to the current outputting amplifier.

4. The voltage regulator of claim 2, wherein the second switch is coupled to the current source and the third switch is coupled to the voltage source.

5. The voltage regulator of claim 4, wherein the current source is controlled based on a current output of the current outputting amplifier.

6. The voltage regulator of claim 4, wherein the voltage source comprises a buck voltage supply.

7. The voltage regulator of claim 1, wherein a non-inverting input of the current outputting amplifier is coupled to a second voltage source providing a reference voltage, and wherein an inverting input of the current outputting amplifier is coupled to a feedback path coupled to an output of the power FET.

8. The voltage regulator of claim 1, wherein the capacitor is configured to act as both a flying capacitor and a compensation capacitor.

9. The voltage regulator of claim 1, wherein the capacitor is not coupled, switchably or not, to a source of the power FET.

10. The voltage regulator of claim 1, wherein the power FET comprises an re-channel metal-oxide semiconductor (NMOS) transistor.

11. The voltage regulator of claim 1, wherein the current outputting amplifier comprises a transconductance amplifier.

12. The voltage regulator of claim 1, wherein the current source is controlled based on a current output of the current outputting amplifier.

13. A method for operating a voltage regulator, comprising:
coupling, in a first mode of operation, a capacitor to a gate terminal of a power field effect transistor (FET);
coupling, in the first mode of operation, the capacitor to an operational transconductor via a current-to-voltage converter and a summer;
decoupling, in the second mode of operation, the capacitor from the operational transconductor;
decoupling, in the second mode of operation, the capacitor from the gate terminal of the power FET;
coupling, in the second mode of operation, the capacitor to a current outputting amplifier via a current source;
coupling, in the second mode of operation, the capacitor to a voltage source separately from the current outputting amplifier, wherein the current outputting amplifier is separate from the voltage source, wherein the operational transconductor is separate from the current outputting amplifier and the voltage source, and wherein an input of the operational transconductor is coupled to an output of the current outputting amplifier; and
decoupling, in the first mode of operation, the capacitor from the voltage source.

14. The method of claim 13, further comprising using the capacitor as both a flying capacitor and a compensation capacitor.

15. The method of claim 13, wherein the power FET comprises an n-channel metal-oxide semiconductor (NMOS) transistor.

16. The method of claim 13, further comprising outputting both proportional and integral terms from a charge pump coupled to the gate terminal of the power FET.

17. The method of claim 13, further comprising switching between the first mode of operation and the second mode of operation based on a frequency of a clock.

18. The method of claim 17, wherein a duty cycle of switching between the first mode of operation and the second mode of operation is fixed and based on the frequency of the clock.

19. The method of claim 17, wherein a duty cycle of switching between the first mode of operation and the second mode of operation is controlled based on a comparison of an output voltage of the voltage regulator to a reference voltage.

20. The method of claim 19, wherein the duty cycle is based on the frequency of the clock when the output voltage of the voltage regulator is less than the reference voltage.

21. The method of claim 20, further comprising operating the voltage regulator in the first mode of operation when the output voltage of the voltage regulator is greater than the reference voltage.

22. The method of claim 13, further comprising:
coupling, in the second mode of operation, the capacitor to the current source; and
decoupling, in the first mode of operation, the capacitor from the current source.

23. The method of claim 22, further comprising controlling the current source based on a current output of the current outputting amplifier.

* * * * *